Figure 1:
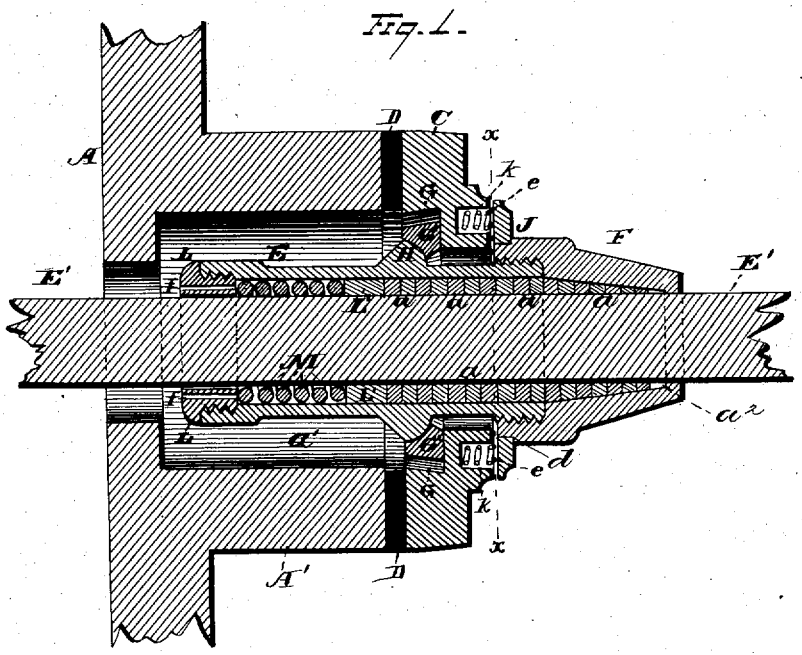

C. T. SLEEPER.

Assignor, by mesne assignments, to C. C. JEROME & D. ANDREWS.

Stuffing-Box for Steam-Engines.

No. 8,335. Reissued July 16, 1878.

WITNESSES

E. J. Nottingham

F. O. McCleary

INVENTOR

Chas T. Sleeper.

By H. A. Seymour.

ATTORNEY

UNITED STATES PATENT OFFICE.

CHARLES T. SLEEPER, OF CHICAGO, ILLINOIS, ASSIGNOR, BY MESNE ASSIGNMENTS, TO CHARLES C. JEROME AND DAVID ANDREWS.

IMPROVEMENT IN STUFFING-BOXES FOR STEAM-ENGINES.

Specification forming part of Letters Patent No. 180,948, dated August 8, 1876; Reissue No. 8,335, dated July 16, 1878; application filed July 5, 1878.

*To all whom it may concern:*

Be it known that I, CHARLES T. SLEEPER, of Chicago, in the county of Cook and State of Illinois, have invented certain new and useful Improvements in Stuffing-Boxes for Steam-Engines; and I do hereby declare the following to be a full, clear, and exact description thereof, which will enable others skilled in the art to which my invention appertains to make and use the same, reference being had to the accompanying drawing, forming part of this specification.

My invention relates to an improvement in stuffing-boxes for steam-engines, the object being to provide a stuffing-box of such construction that it may be secured to the cylinder or chest of a steam-engine in such a manner as to automatically adjust itself in line with the piston and preserve a steam-tight joint, to prevent any leakage of steam, and also obviate any uneven strain or wear on the steam-packing.

A further object of my invention is to provide a stuffing-box of such construction that any desired length of packing may be placed around the piston-rod or valve-stem, irrespective of the length of the annular flange on the cylinder or valve-box.

Another object of my invention is to provide a rocking bearing for the sleeve inclosing the packing at a point outside the flange on the cylinder-head.

With these several ends in view, my invention consists, first, in the combination, with an annular flange projecting from the head of a cylinder or valve-box, of a face-plate secured to its outer end, and a tubular packing-sleeve having a rocking bearing in a recess in the face-plate, whereby the piston may be provided with packing within and without the annular flange.

My invention further consists in the combination, with a face-plate having a recess formed in its face, which is placed toward the cylinder, of a tubular packing-sleeve provided with a rocking bearing, and a ring interposed between the bearing on the packing-tube and the recess in the face-plate, whereby the stuffing-box is made to extend beyond the annular flange on the cylinder-head, and the packing-sleeve is adapted to have a rocking movement in the face-plate.

My invention further consists in the combination, with the face-plate having a recess formed in its face adjacent to the cylinder, of a receptacle for packing, having a converging packing-space therein, said receptacle provided with a rocking bearing-surface, which is supported by a ring located in the recess formed in the face of said plate, whereby an elongated packing-receptacle is secured for use on cylinders, irrespective of the length of the annular flange on the cylinder-head, and the packing adapted to be forced into the converging portion of the packing-receptacle, and thus caused to fit snugly around the piston-rod.

My invention further consists in the combination, with a face-plate having a recess formed in its face which is placed toward the cylinder, of a packing-receptacle provided with a rocking bearing, and a ring interposed between said bearing on the packing-receptacle and the face-plate, the opposing surfaces on the packing-receptacle and ring being concave and convex, to constitute a rocking bearing for the tubular packing-receptacle.

My invention further consists in the several details of construction and combinations of parts, as will hereinafter be described, and pointed out in the claims.

Figure 2:
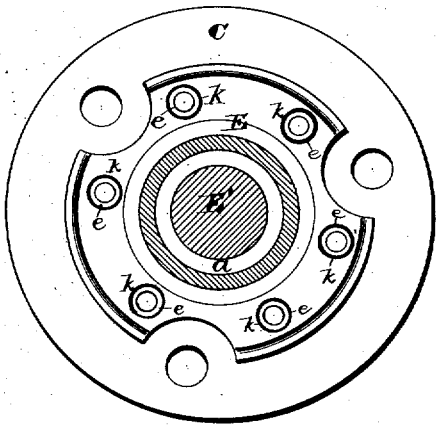

In the accompanying drawings, Figure 1 is a longitudinal central section of my improved stuffing-box, and Fig. 2 is a transverse section of the same on the line $x\ x$ in Fig. 1.

A represents a section of a portion of a cylinder-head of a steam-cylinder, which is provided with an annular flange, A′, which constitutes the ordinary form of stuffing-box. To the outer end of flange A′ is secured, in any manner desired, an annular face-plate, C, a rubber or other flexible gasket, D, being interposed between the flange and cap to insure a steam-tight joint. E is the packing-sleeve, and extends within the cavity in the annular flange A′, and outwardly through the central opening in the face-plate C. The sleeve E is of less diameter than that of the annular flange A′, whereby there is formed an intervening annular space, $a^1$, to allow of the radial movement of said sleeve in the space within the flange A′. The bore of the sleeve E is of greater diameter than the piston-rod, in order that an intervening annular space may be formed for the reception of a series of metallic packing-rings, *a*, which encircle the piston-rod E′ and constitute the packing therefor. The outer end of the sleeve has a cap, F, secured thereto, which latter is provided with a conical or converging bore, $a^2$.

The opening in the end of the cap F adjacent to the sleeve corresponds in size and shape to the opening in the sleeve, and gradually decreases in size toward the outer end of the cap, until the size of the opening or cavity of the cap but slightly exceeds the size of the piston-rod.

It will be observed that the packing-receptacle E F, when placed on a piston-rod, forms an annular chamber for the reception of any suitable number of metallic packing-rings, and as the rings are worn away, by reason of their contact with the piston-rod, they are kept in direct contact with said piston-rod by means of the converging or conical cavity $a^2$ in the outer end of the packing-receptacle, which serves to contract the rings in size and force them snugly against the piston-rod.

L′ is a metal ring or follower loosely placed upon the piston-rod to bear against the inner packing *a*, and is held in close contact therewith by means of a coiled spring, M, one end of which bears upon the follower L′, while its opposite end rests against the cap L, which is secured to the inner end of the packing-sleeve E. Cap L may be provided with perforations *f*, to admit of the passage of steam from the cylinder into the tube or sleeve E, and exert pressure against the follower L′, thus operating to force the packing outwardly into the conical portion of the packing-receptacle, and form a steam-tight joint around the piston-rod.

Having now described one form of packing-receptacle for carrying the main and important features of my improvement into effect, I will now describe the means employed for securing the packing-receptacle to the flange on the cylinder-head

The face-plate C is provided with an annular recess, G, on its face, located adjacent to the cylinder-head. Within recess G is placed a packing-ring, G′, having a ground face, which rests on a ground seat on the face-plate, thereby insuring a steam-tight joint between the ring and face-plate. The diameter of the ring G′ is less than that of the recess G, to allow of the free radial movement of the ring and preserve a steam-tight joint between such parts at all times, irrespective of their relative positions. The inner face of ring G′ is provided with an annular concave bearing-surface, which fits against a convex bearing-surface on a collar, H, formed on the tubular sleeve E.

The method of connecting the tubular sleeve with the face-plate, as above described, allows of any desired range of adjustment, which is automatically regulated in accordance with the position or movement of the piston-rod.

The tubular sleeve is adapted to have a free rocking movement on the ring G′, and the latter is also adapted to be moved radially in the annular recess in the face-plate, so that in case the piston-rod travels out of line, it will automatically shift the position of the rocking bearing G′, and preserve a steam-tight joint under all circumstances.

The outer surface of the cap-plate C has its central portion C′ extended outwardly any desired distance beyond the face of said plate, in order to provide a bearing for the tubular sleeve outside the annular flange on the cylinder-head.

Within the outer face of the cap-plate are formed any desired number of pockets, *k*, for the reception of coiled springs *e*, upon which is placed an annular plate, J, the same being held in place by a shoulder, *d*, on the conical cap F.

The coiled springs *e* operate to force the packing-receptacle E F outwardly, and force the collar H snugly against its bearing, and prevent any leakage of steam when steam is exhausted from the stuffing-box.

From the foregoing it will be observed that my improved stuffing-box is adapted to be readily applied to any cylinder-head or valve-box to pack the piston-rod or valve-stem, and any desired length of the rod or stem may be packed, regardless of the length of the flange on the cylinder-head or valve-box.

As the pistons and valves are being continually worn away on one side, the piston-rod or valve-stem will not travel in a true horizontal line, and without some provision being made, the wear and strain on the packing and stuffing-box is unequal, thereby causing increased friction and wear of the parts.

By means of my improved stuffing-box provision is made for obviating these defects and difficulties, and the wear on the packing is rendered uniform and even at all times, regardless of the uneven wear or irregular travel of the piston or piston-rod.

It is evident that many changes in construction and arrangement of parts may be resorted to without departing from the spirit of my invention, and hence I do not limit myself to the exact construction shown and described; but, Having fully described my invention, what I claim as new, and desire to secure by Letters Patent, is—

1. The combination, with an annular flange on the head of a cylinder or valve-box, of a face-plate secured to the outer end of said annular flange, and a packing-receptacle having a rocking bearing within the recess in the face-plate, substantially as set forth.

2. The combination, with a face-plate provided with a recess in its face which is located toward the cylinder, of a tubular packing-sleeve having a rocking bearing, and a ring interposed between the recess in the face-plate and the rocking bearing on the packing-sleeve, substantially as set forth.

3. The combination, with a face-plate provided with a recess in its face adjacent to the cylinder to which it is secured, of a packing-receptacle having an inner converging packing-space, and provided on its outer surface with a rocking bearing which rests against a ring located in the recess in the face-plate, substantially as set forth.

4. The combination, with a face-plate having a recess formed in its face which is placed toward the cylinder, of a packing-receptacle provided with a convex bearing, and a ring located in the recess of the face-plate, said ring formed with an annular concave bearing, substantially as set forth.

5. The combination, with a face-plate having a recess formed in one side thereof, of a packing-receptacle provided with a collar between its ends, said collar being inclosed in the recess in the face-plate, substantially as set forth.

6. The combination, with a face-plate having a recess formed in one side thereof, of a packing-receptacle having an inner converging space for metallic packing, and provided with a collar between its opposite ends, said collar being located within the recess in the face-plate, substantially as set forth.

7. The combination, with a face-plate having a recess formed in one side thereof, of a receptacle for metallic packing, supported within the recess in the face-plate by a rocking bearing, which latter is adapted to have a radial movement, substantially as set forth.

8. A tubular sleeve provided ~~with~~ an annular outside rocking bearing between its opposite ends, substantially as set forth.

9. The combination, with a packing-receptacle having an interior converging space for metallic packing, of a face-plate provided with a recess for the reception of the rocking bearing on the packing-receptacle, and means for keeping the rocking bearing steam-tight by spring-pressure, substantially as set forth.

10. The combination, with a packing-receptacle, of a face-plate having a recess in its side located adjacent to the cylinder-head, the inner end of said recess being of greater diameter than the opening within the annular flange on the cylinder-head, whereby the ring against which rests the packing-receptacle may have any desired extent of radial movement, regardless of the diameter of the opening in the annular flange, substantially as set forth.

11. The combination, with an annular face-plate, of a packing-receptacle provided with a rocking bearing, and constructed and arranged to extend through the opening in the annular face-plate, substantially as and for the purpose set forth.

CHAS. T. SLEEPER.

Witnesses:
WILLIAM EDGAR,
D. MACKINTOSH.